United States Patent
Allo

(10) Patent No.: US 11,645,393 B2
(45) Date of Patent: May 9, 2023

(54) SECURE BOOTING IN A DATA STORAGE DEVICE WITH FRONT END BUS

(71) Applicant: Seagate Technology LLC, Fremont, CA (US)

(72) Inventor: Christopher Nicholas Allo, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 167 days.

(21) Appl. No.: 16/946,478

(22) Filed: Jun. 24, 2020

(65) Prior Publication Data

US 2020/0410105 A1 Dec. 31, 2020

Related U.S. Application Data

(60) Provisional application No. 62/868,316, filed on Jun. 28, 2019.

(51) Int. Cl.
| | | |
|---|---|---|
| *G06F 21/00* | (2013.01) | |
| *G06F 21/57* | (2013.01) | |
| *G06F 21/55* | (2013.01) | |
| *G06F 21/54* | (2013.01) | |
| *G06F 3/06* | (2006.01) | |
| *G06F 21/78* | (2013.01) | |

(52) U.S. Cl.
CPC .......... *G06F 21/575* (2013.01); *G06F 3/0622* (2013.01); *G06F 3/0632* (2013.01); *G06F 3/0658* (2013.01); *G06F 3/0673* (2013.01); *G06F 21/54* (2013.01); *G06F 21/554* (2013.01); *G06F 21/78* (2013.01)

(58) Field of Classification Search
CPC .... G06F 21/575; G06F 3/0622; G06F 3/0632; G06F 3/0658; G06F 3/0673; G06F 21/54; G06F 21/554; G06F 21/78

See application file for complete search history.

(56) References Cited

U.S. PATENT DOCUMENTS

| | | | |
|---|---|---|---|
| 7,725,703 B2 | 5/2010 | Hunter et al. | |
| 8,868,923 B1 | 10/2014 | Hamlet et al. | |
| 9,569,623 B2 | 2/2017 | Kocher et al. | |
| 9,613,215 B2 | 4/2017 | Cox et al. | |
| 2014/0256419 A1* | 9/2014 | Laputz | G06F 21/575 463/29 |
| 2015/0127930 A1* | 5/2015 | Offenberg | G06F 21/572 713/2 |
| 2017/0364683 A1* | 12/2017 | Willden | G06F 21/53 |
| 2019/0236281 A1* | 8/2019 | Hershman | G06F 13/362 |
| 2019/0363894 A1* | 11/2019 | Kumar Ujjwal | H04L 9/3268 |

* cited by examiner

*Primary Examiner* — Tri M Tran
(74) *Attorney, Agent, or Firm* — Westman, Champlin & Koehler, P.A.

(57) ABSTRACT

A data storage device can employ a front end bus for boot operations. The physical connection of a secure boot assembly to the front end bus can provide efficient and reliable booting of the data storage device without a connection to a remote host or network. A secure boot assembly can provide a security module that connects to the boot module of the data storage device to authenticate a trustworthiness of the data storage device while the data storage device is disconnected from any remote host.

20 Claims, 4 Drawing Sheets

ID = "1" />

SECURE BOOTING IN A DATA STORAGE DEVICE WITH FRONT END BUS

RELATED APPLICATION

The present application claims priority to U.S. Provisional Patent Application No. 62/868,316 filed Jun. 28, 2019, the contents of which is hereby incorporated by reference.

SUMMARY

In some embodiments, a data storage device employs a boot module connected to a front end bus for boot operations in response to the physical connection of a secure boot assembly to the front end bus. The secure boot assembly provides a security module that connects to the boot module of the data storage device to authenticate a trustworthiness of the data storage device while the data storage device is disconnected from any remote host or network.

A data storage device, in other embodiments, connects a data storage device to a secure boot assembly with the data storage device having a boot module connected to a front end bus and the secure boot assembly inserted into the front end bus. The secure boot assembly having a security module connected to the boot module configured to verify the trustworthiness of the data storage device without the data storage module connected to any network. Security information is authenticated and provided to the boot module with the security module without the secure boot assembly connected to any network. The security information is then loaded in the data storage device to initialize and make available secure data access capabilities of the data storage device.

Various embodiments of a data storage device initialize the device with an unoccupied front end bus. An initial boot sequence is executed with a boot module of the data storage device to provide less than all of the data storage capabilities possible with the data storage device in response to the unoccupied front end bus. The connection of a secure boot assembly to the front end bus allows the trustworthiness of the data storage device to be verified by the boot controller without the data storage device connected to any network. Security information is authenticated and provided to the boot module with a security module without the secure boot assembly connected to any network. The security information is then loaded in the data storage device to initialize and make available secure data access capabilities of the data storage device.

DETAILED DESCRIPTION

The assorted embodiments presented in the present disclosure are generally directed to a data storage device with a front end bus that allows for secure booting operations to be conducted without the data storage device being connected to a remote host.

The advent of wired and wireless broadband data connections has allowed for distributed computing networks where computing resources are shared. A distributed computing network can allow a host to utilize greater data capacity, processing power, and security features than present in the host itself. However, the interconnections of numerous computing nodes can be prone for third-party attacks that may steal, alter, and hold ransom various aspects of the distributed computing network. Such third-party attacks may infiltrate a single network node and compromise the data and command integrity of every other network node. Hence, it is a continued goal to provide nodes of a distributed computing network with increasingly robust security measures to ensure the node is not the source of a third-party attack or susceptible to infiltration from unauthorized parties that have accessed other areas of the distributed network.

A distributed computing network can be secured during a booting operation, in accordance with various embodiments, by verifying an externally connected boot card with a boot module of a data storage device while the data storage device is disconnected from the distributed network. The disconnection of the data storage device from a distributed computing network ensures no third-party attack can infiltrate the booting operations conducted between the connected card and the boot module. The requirement of physical, on-site engagement of the boot card with a front end bus of the data storage device further ensures the integrity of the security and firmware data provided to the boot module by the boot card.

Figure 1:
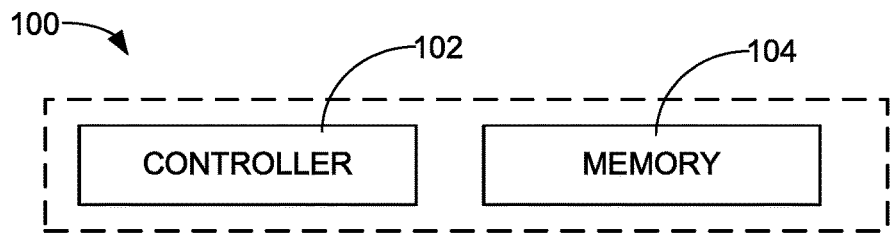
FIG. 1 depicts a block representation of an example data storage device in which various embodiments may be practiced.

By developing a boot strategy with the data storage device being disconnected from a distributed computing network, the booting operations conducted in connection with the boot card can be efficiently conducted without separately certifying each security key, signature, and firmware command. FIG. 1 is a block representation of an example data storage device in which various embodiments can be practiced. The data storage device 100 includes a controller 102 and a memory 104. The controller may include one or more hardware and/or programmable processing circuits that execute programming instructions (e.g., firmware) in a local processor memory to provide top level control functions for the device.

The memory 104 incorporates one or more non-volatile memory (NVM) for the storage of user data from a host device. Data storage devices store and retrieve data in a fast and efficient manner. Some data storage devices, such as hard disc drives (HDDs), store data in memory 104 that uses rotatable data recording media. Such media may take the form of one or more magnetic recording discs which are accessed using a corresponding array of data transducers (heads). The transducers incorporate sliders with air bearing surfaces that aerodynamically support the sliders in close proximity to the media surfaces by fluidic currents of the surrounding atmosphere established by high speed rotation of the media. Write elements are supported by the sliders to magnetically write data in the form of alternating magnetic patterns to tracks defined on the media surfaces. Read sensors are supported by the sliders to sense the magnetic patterns and recover the previously stored data. Other active and passive elements can be incorporated into the sliders such as a head assisted magnetic recording (HAMR) system, a fly height adjustment mechanism, a contact sensor, etc.

Other forms of data storage devices such as solid-state drives (SSDs) use solid-state semiconductor memory to provide non-volatile memory storage. The memory may be erasable memory such as NAND or NOR flash, or may be rewritable-in-place memory such as STRAM, RRAM, PCRAM, etc. Solid-state memory tends to provide significantly faster data input/output (I/O) transfer rates as compared to rotatable media, since the solid-state memory does not involve the latencies normally associated with moving the transducer to a target track and waiting for the disc to rotate past the transducer. At the same time, solid-state memory tends to be more expensive than rotatable media, and may have other performance related issues as well such as limited program/erase (PE) count service life, etc.

So-called hybrid devices use multiple different forms of non-volatile memory to store user data for a host device. Some hybrid devices combine the rotatable media of a hard disc drive (HDD) with the flash memory of a solid-state drive (SSD) to provide a hybrid solid-state drive (HSSD). An HSSD utilizes the rotatable media for long term storage of user data, and promotes (pins) certain data sets to the faster flash memory to achieve higher data transfer rate performance. While operable, HDD, SSD, and HSSD data storage devices can be susceptible to third-part attacks, particularly during booting operations where firmware and security commands are provided and. executed.

A data storage device may have a top level (primary) controller configured to access data to a main non-volatile memory (NVM), and a front end controller configured to access data to a secondary NVM. The secondary NVM has a different construction as compared to the main NVM and has a higher data transfer rate than the main NVM. While not limiting, in some embodiments the primary and front end controllers comprise programmable processors, the main NVM is a stack of one or more rotatable magnetic recording discs, and the secondary NVM is NAND flash memory.

The storage device can be configured to operate in different processing modes. These modes are respectively referred to as a normal I/O mode and a front end 110 mode. During the normal I/O mode, the top level controller receives access commands from a host device and services the commands as required to transfer data between the host device and the storage device. For example, during the servicing of a write command to transfer input write data to the storage device, the top level controller will determine, based on various factors, whether to direct storage of the input write data to the primary NVM (e.g., discs) or the secondary NVM (e.g., flash). The data are thereafter directed to the appropriate memory location(s).

Similarly, during the servicing of a read command to return selected read data. back to the host, the top level controller will determine a location of the requested read data and access the primary NVM, secondary NVM or some other memory location (e.g., read or write buffer, etc.) to return the data back to the host. It will be noted that during normal I/O mode, the data stored by the data storage device in the primary and secondary NVMs "belongs" to that storage device in the sense that the data was specifically directed to that storage device from a particular host. The top level controller of the storage device has primary responsibility for the contents and usage of the respective primary and secondary NVMs.

During an exemplary front end I/O mode, however, the secondary NVM of the storage device is controlled by the host device rather than the top level controller. Depending on the architecture of the storage device, commands issued by the host during front end I/O mode may still be initially processed by the top level controller, but the top level controller will forward the commands directly to the controller of the secondary NVM, which will proceed to operate the secondary NVM as a separate memory. This allows the host device to use the faster secondary memory for high priority tasks and data.

In some cases, multiple storage devices may be grouped together into an array to form a large memory space, such as in a multi-device enclosure used in a cloud processing environment. The host device can consolidate the secondary NVM from the storage devices to provide a consolidated, distributed front end memory space. During front end I/O processing, the secondary NVM of a first storage device may store data associated with a different, second storage device in the array.

Figure 2:
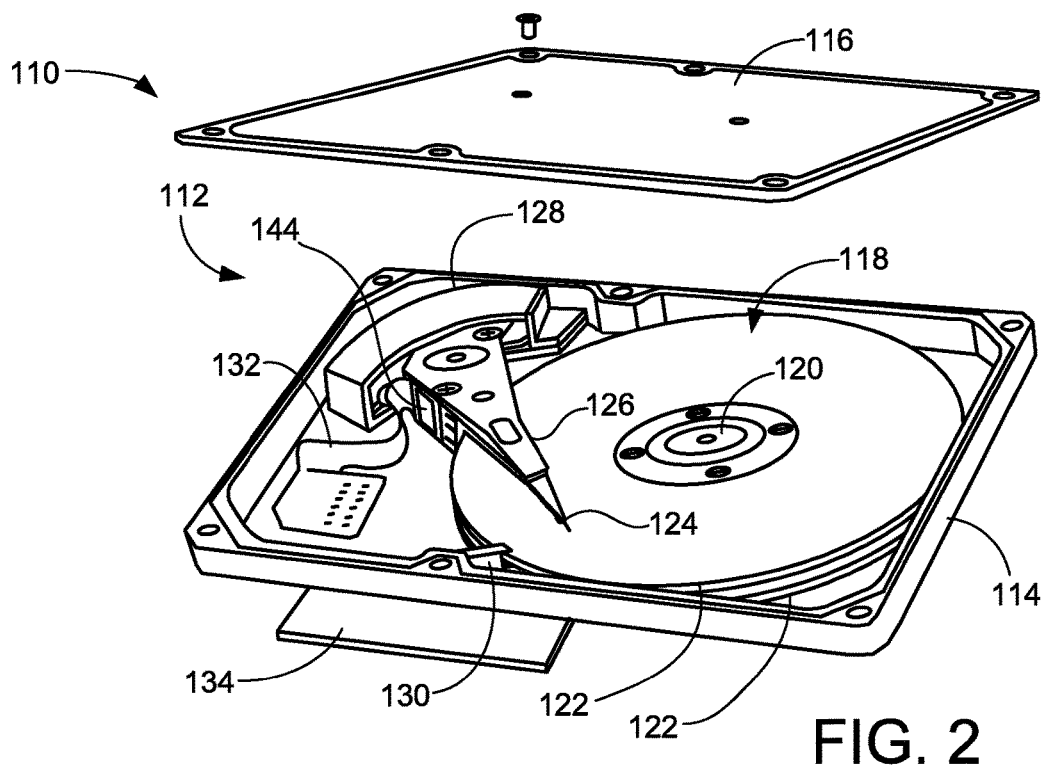
FIG. 2 is a line representation of the storage device of FIG. 1 in accordance with some embodiments.

FIG. 2 shows an example data storage device 110 that corresponds to the data. storage device 100 in FIG. 1 in some embodiments. The device 110 is characterized as a hybrid data storage device that uses both HDD (disc) and SSD (flash) NVM to store and retrieve user data. Other forms of data storage devices may be used. The hybrid device 110 consists of an environmentally sealed housing 112 formed from a base deck 114 and top cover 116. A disc stack 118 is disposed within the housing having a spindle motor 120 arranged to rotate a number of magnetic recording discs 122, in this case two, at a constant high speed.

Data are stored to tracks defined on the various disc surfaces using an array of read/write data transducers (heads) 124. The heads 124 are supported by a rotary actuator 126 and are radially positioned using a voice coil motor (VCM) 128. A load/unload parking ramp structure 130 can be used to support the heads 124 away from the disc surfaces when the device 110 is transitioned to a deactivated state. Each combination of head and data recording surface is referred to as a head/disc interface, or HDI.

Control and data signals are passed between the active elements of the actuator 126 and control electronics of the device using a flex circuit assembly 132. The flex circuit assembly passes the signals through the base deck 114 using a bulkhead connector to an external printed circuit board assembly (PCBA) 134. The PCBA 134 supports the control electronics and other external elements of the device.

Figure 3:
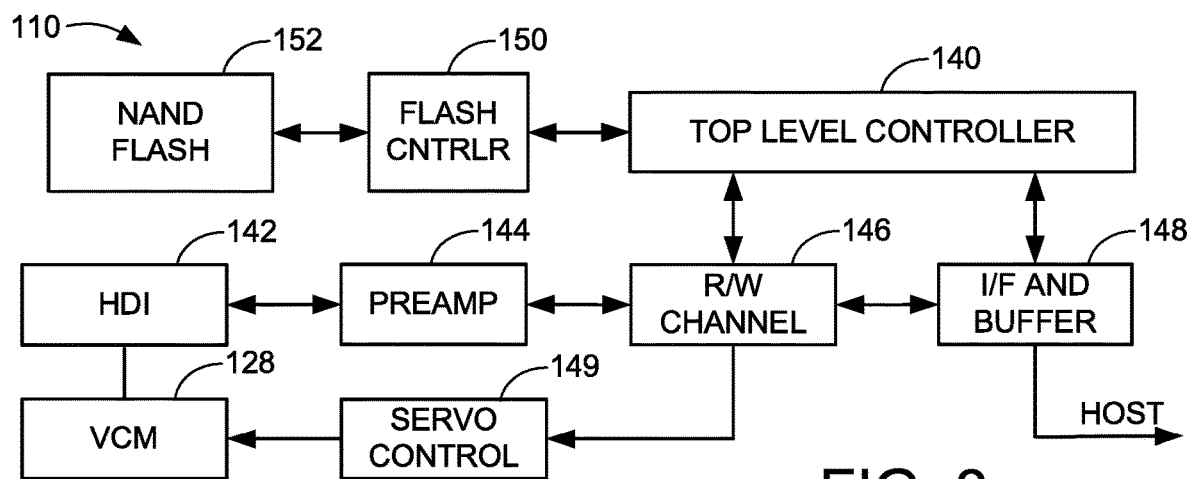
FIG. 3 displays a block representation of portions the storage device of FIG. 2 functionally arranged in accordance with assorted embodiments.

FIG. 3 provides a functional block representation of the hybrid device 110 of FIG. 2 in some embodiments. Other architectures may be used as desired. It will be recognized that many of the elements in FIG. 3 constitute the control electronics supported on the PCBA 134. A top level controller 140 generally corresponds to the controller 102 in FIG. 1 and provides top level control functions for the device.

In some embodiments, the top level controller includes one or more programmable processors and associated firmware incorporated into a system on chip (SOC) integrated circuit device. For reference, the top level controller 140 is also referred to as a first or primary controller, and the recordable discs 122 and heads 124 (e.g., collectively, the HDIs 142) are referred to as a first or primary NVM. A data path is established between each HDI 142 and the host using a preamplifier/driver circuit (preamp) 144, a read/write (R/W) channel circuit 146 and an interface (I/F) and buffer circuit 148.

The preamp 144 may be mounted to the side of the actuator 126 as shown in FIG. 2. The buffer portions of the circuit 148 may take various forms of volatile or non-volatile memory such as DRAM, SRAM, NOR flash, etc. to temporarily store data during data transfers. A servo control circuit 149 uses embedded servo information from the respective discs 122 to provide position control currents to the VCM 128 to position the heads 124.

A flash controller 150 is coupled to the top level controller 140 to provide access control for solid-state memory 152, which in this example takes the form of NAND flash memory. The flash controller 150 may be a separate processor circuit in a different IC, or may be incorporated into the main SOC of the top level controller 140. The flash controller 150 is also referred to as a second or secondary controller, and the NAND flash 152 is also referred to as a second or secondary NVM. It is noted that the secondary controller 150 may be resident in the secondary NVM and communicate with a front end controller for some operations. For instance, a front end controller can be part of, or separate from, the top level controller 140 to utilize secondary NVM, via the flash controller 150, for selected data storage device operations.

The respective primary and secondary controllers 140, 150 cooperate during normal I/O data transfer operations to service access (e.g., write and read) commands from the host device using the primary and secondary NVMs 142, 152. A number of different arrangements can be used during such normal operation. In one approach, all input write data is initially written to the NAND flash 152, after which the data are cleaned (migrated) from flash to the discs 122. In another approach, some data sets are written to the flash memory and other data sets are directed to the discs without passing through the flash.

Depending on the data integrity scheme employed by the device 110, all data written to the flash memory may be copied to disc to provide a backup copy, even if the data sets remain in the flash as well. In still other cases, certain hot data may be promoted (pinned) from disc to flash so that a copy of the data is moved to the flash for faster access. Suitable mapping structures are maintained in local memory (e.g., DRAM, etc.) to provide a map of the locations of the various data sets in the system.

It is contemplated that the flash memory 152 and the flash controller 150 in FIG. 3 form a permanent portion of the hybrid device 110, so that these elements are incorporated into the external PCBA 134 shown in FIG. 2. However, in an alternative embodiment, the PCBA 134 is configured as shown in FIG. 4 to accept plug-in SSD cards that can be added as desired to supply the flash memory and, as required, the flash controller for the device.

Figure 4:
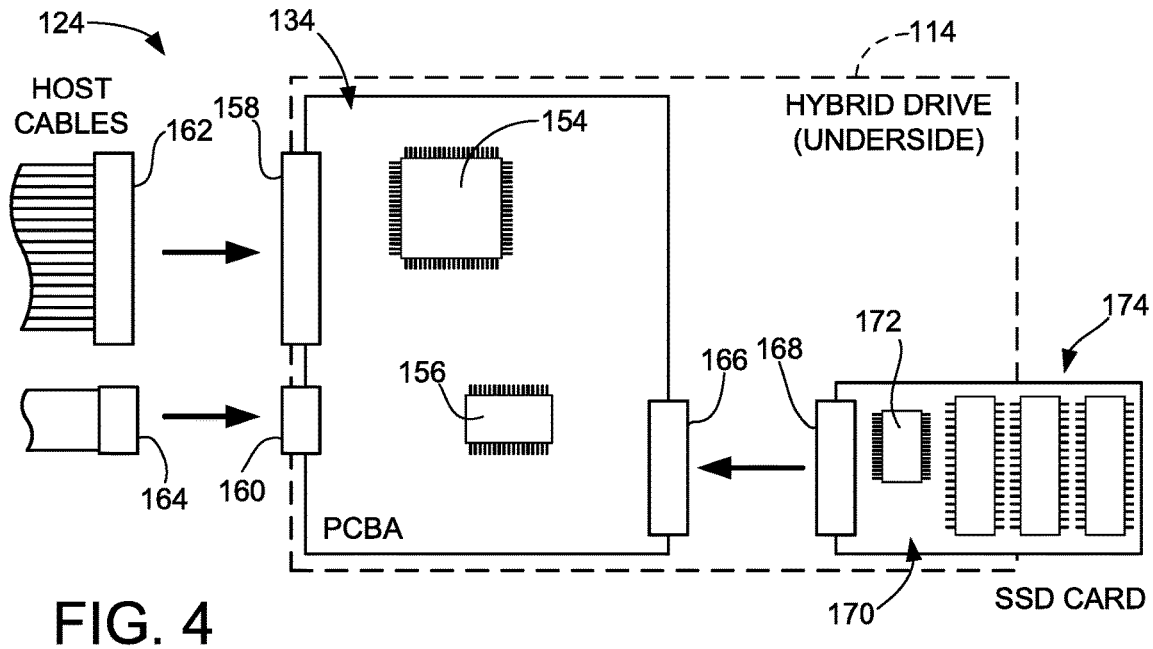
FIG. 4 shows portions of an example data storage device configured in accordance with some embodiments.

FIG. 4 is a bottom side representation of the hybrid device 110 arranged in accordance with some embodiments. The outermost perimeter of the base deck 114 is represented in broken line fashion. The PCBA 134 is secured to the underside of the base deck 114 using suitable fasteners or other attachment mechanisms. Exemplary control electronics are represented by ICs 154, 156, but it will be understood that the surfaces of the PCBA 134 may include many additional components that have been omitted for clarity of illustration.

The PCBA 134 has first and second input connectors 158, 160 that can take any suitable form, as desired, to support, various interconnect protocols including but not limited to SATA, SAS, SCSI, ATA, USB, PCIe, NVMe, Fibre Channel, Firewire, Ethernet, etc. While not limiting, in one embodiment it is contemplated that the first connector 158 provides a multi-pin SATA connection and the second connector 160 provides a serial bus connection. Mating cable assemblies 162, 164 from an upstream host are configured to mate with the PCBA connectors 158, 160. Other attachment configurations can be used, such as by plugging the PCBA into a dangle, a midplane board, etc. Wireless interfaces are also contemplated.

The PCBA connectors 158, 160 are edge connectors aligned along a perimeter edge of the base deck 114 to facilitate easy connection with the connectors 162, 164. The PCBA 134 further has a front end bus 166 configured to removably mate with a corresponding connector 168 of an external SSD card 170. As before, any number of suitable interconnection arrangements can be used as desired. The bus 166 can be characterized as a front end connector due to the ability to cooperate with other control components, such as ICs 154/156, of the device 124 to manage front end operation of the device. For example, the front end bus 166 can recognize connection of a card 170 employing any type of memory and utilize that memory to optimize front end operation of the device 124 while the rotating data storage media of the disc stack 118 maintains long-term data storage functions.

Although not required, various embodiments position the front end bus 166 to be exposed to an exterior of the base deck 114 while the disc stack 118 is wholly contained within an internal cavity within the housing 112. That is, the SSD card 170 can be separated from the internal cavity of the housing 112 Chile being physically and electrically connected to the front end bus 166. The card 170 plugs into the PCBA 134 to add various features such as the flash controller 150 and NAND flash memory 152 from FIG. 3, as generally depicted by ICs 172 and 174. Any number of different types of memory cards can be used, including standardized memory cards (e.g., MemoryStick, SD cards, USB flash drives, etc.). The ability to plug in cards such as 170 provides flexibility in that failed or worn out memory can be easily replaced, the amount of SSD storage can be upgraded, and so on.

In some cases, the flash controller 150 is incorporated into the main PCBA 134, allowing memory modules with flash memory to be coupled via the connectors 166, 168. The PCBA 134 may also incorporate a first amount of flash memory, allowing the SSD card 170 to provide an additional, second amount of flash memory to upgrade the capacity of the device. Other attachment locations and configurations can be used for the SSD card 170, but it is contemplated that, when installed, the SSD card will be recessed within the overall footprint of the storage device (e.g., boundary 114). In some embodiments, the firmware executed by the top level controller 140 can be configured to detect the presence or absence of the SSD card 170, and operate accordingly.

Figure 5:
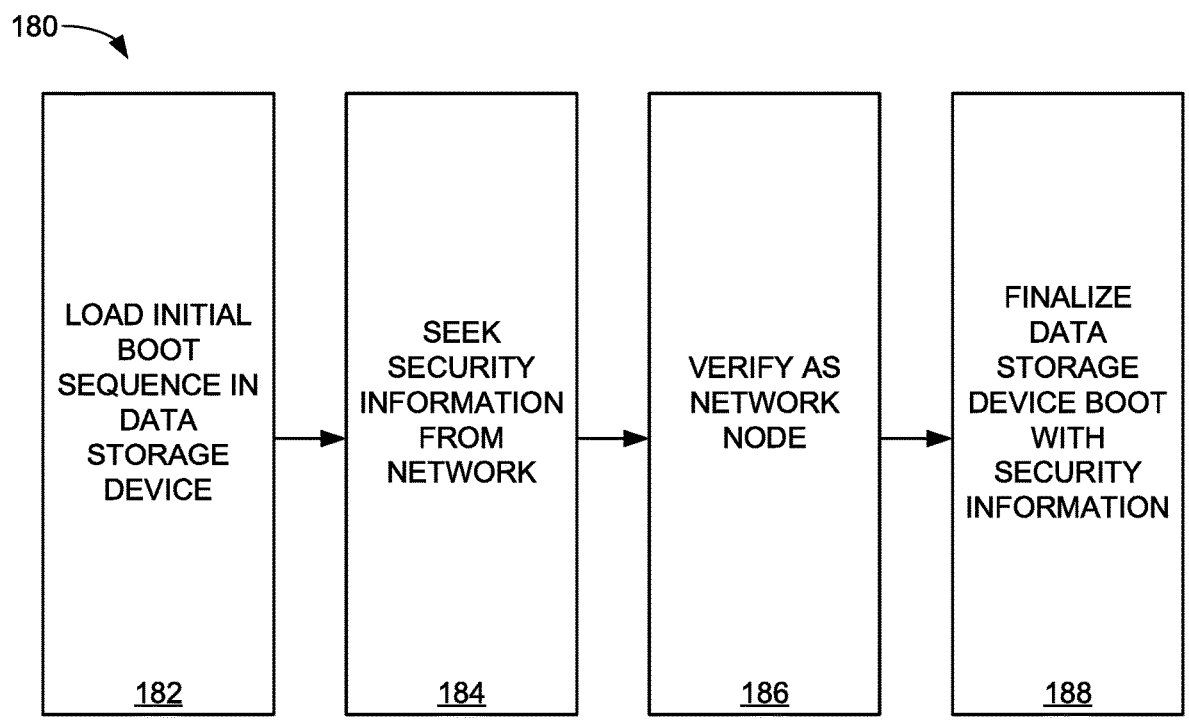
FIG. 5 illustrates an example process flow for a boot operation carried out in accordance with various embodiments.

FIG. 5 depicts an process flow for an example boot operation 180 that can be conducted by a data storage device, such as an HDD, SSD, or HSSD, with an external front end bus that is not connected to a secure boot assembly. That is, the boot operation 180 is expected to occur while the data storage device is connected to a distributed network during device startup and initialization without a boot card/assembly connected to the front end bus. It is contemplated that an SSD card/assembly is connected, but that card/assembly does not have boot information/data that is utilized by the data storage device.

The boot operation 180 begins with the data storage device loading an initial boot sequence where operational commands are executed in step 182. Operational commands are not limited, but can consist of one or more software and/or hardware initializations, such as clock registration, hardware polling, and memory activation. Execution of the operational commands of step 182 may, or may not provide a functional, stand-alone data storage device, but are at least meant to prepare the data storage device for security information that allows control to be taken by device firmware.

The prepped data storage device then seeks security information, such as network keys, certificates, and encryption codes, from the distributed network in step 184. The data storage device can undergo a number of different verification actions with at least one network host. As a result of the verification actions, the data storage device becomes trusted in step 186 and loads one or more security protocols that allows the data storage device to access the network and vice-versa. Once the data storage device is a trusted network node with network access, any remaining hardware and software startup and/or initialization is conducted in step 188 to finalize the boot operations to provide the full data storage functionality to the network.

While the hoot operation 180 can be conducted efficiently in some cases, the concurrent booting, restarting, and/or power cycling of numerous data storage devices of a distributed network can create network performance bottlenecks that jeopardize the reliability of the network, it is contemplated that portions of the security verification of a data storage device may be skipped or delayed during hoot operations to improve startup time, but such activity can jeopardize the integrity of the network as a source, repository, and executor of commands and data can be infiltrated by a third-party attacker. For example, firmware can be copied, modified, or bypassed to allow unwanted network access that is difficult to identify or correct.

Accordingly, various embodiments are directed to conducting boot operation with the data storage device disconnected from a distributed network and conducting security, verification, and authentication functions instead with a connected and attached secure boot assembly. The authentication and verification of a data storage device via a connected secure boot assembly instead of a distributed network protects the boot operation from unwanted infiltration from third-party attackers while increasing the efficiency of the secure boot process as network latencies are avoided. By utilizing a physical secure hoot assembly instead of a distributed network to attain security information that enables the data storage device to be securely booted, the security information can more efficiently be trusted due to the lower risk that the security information has been compromised by a third-party attacker.

Figure 6:
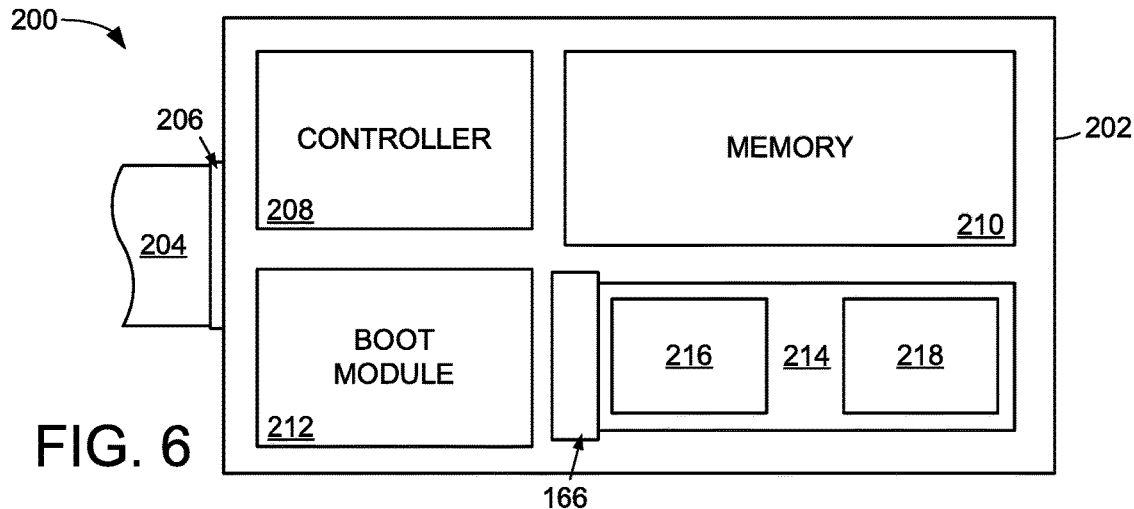
FIG. 6 depicts portions of an example data storage device in which assorted embodiments can be executed to provide a secure booting operation.

FIG. 6 depicts a block representation of portions of an example distributed data network 200 in which assorted embodiments can be practiced. The network 200 can consist of any number of data storage devices 202 connected to a network controller and host via wired 204, or wireless, interconnections that are received via at least one device bus 206. The data storage device 202 can employ one or more local controllers 208 that direct data accesses to local memory 210, such as non-volatile long-term repository. The controller 208 may also direct a boot module 212 in carrying out startup and initialization operations for the data storage device.

In the absence of a secure boot assembly 214, which may be a CBA card capable of being inserted and removed from a front end bus at will, the boot module 212 can conduct various activity, as generally discussed in FIG. 5, that allows the assorted data storage aspects of the data storage device to be used. For instance, the boot module 212 can map, recognize, poll, and/or test the memory 210 to determine what data is stored, where the data is stored, and is the data current or stale. The boot module 212 may further initialize the firmware of the data storage device to conduct various data security, maintenance, and updates.

The use of the boot module 212 can provide efficient initialization of the data storage device 202 in response to a loss of power, power cycle, or intentional reset. However, such activity can be plagued by attacks by unwanted users that can hijack, copy, and/or modify the operation of the boot module 212 to allow third-party access to the data storage device 202 and any connected nodes of a network. Hence, the secure boot assembly 214 can be physically inserted into the front end bus 166 prior to initialization of the data storage device 202 to ensure the safe, authentic initialization of both hardware and software.

Although not required or limiting, the secure boot assembly 214 can have a security module 216 and an authentication module 218 that each can be resident in hardware circuitry and/or in software executed by a processor resident on the assembly 214. The security module 216 can store and/or generate the sufficient security information to startup and initialize the data storage device 202 in combination with the boot module 212. The security module 216 may conduct various cryptographic and/or decryptographic functions to provide the boot module with at least the security keys, certificates, and encryption codes needed to execute assorted software and hardware initialization that would, otherwise be impossible without the security information.

The authentication module 218 can conduct one or more verification functions to ensure the security information in the security module 216 is authentic and trustworthy. The authentication module 218 may carry out one or more functions in combination with the boot module 212 to verify the source and destination of the security information. For instance, the authentication module 218 may poll hardware and/or software of the data storage device 202 to ensure the device is the proper and intended destination for security information. As another non-limiting example, the authentication module 218 may continuously or sporadically poll the security information, or generating algorithms, in the security module 216 to ensure consistency that proves no tampering or changing has occurred. The authentication module 218 may also trigger stale security information to be purged or altered at certain times to ensure the security information is not inadvertently copied.

Figure 7:
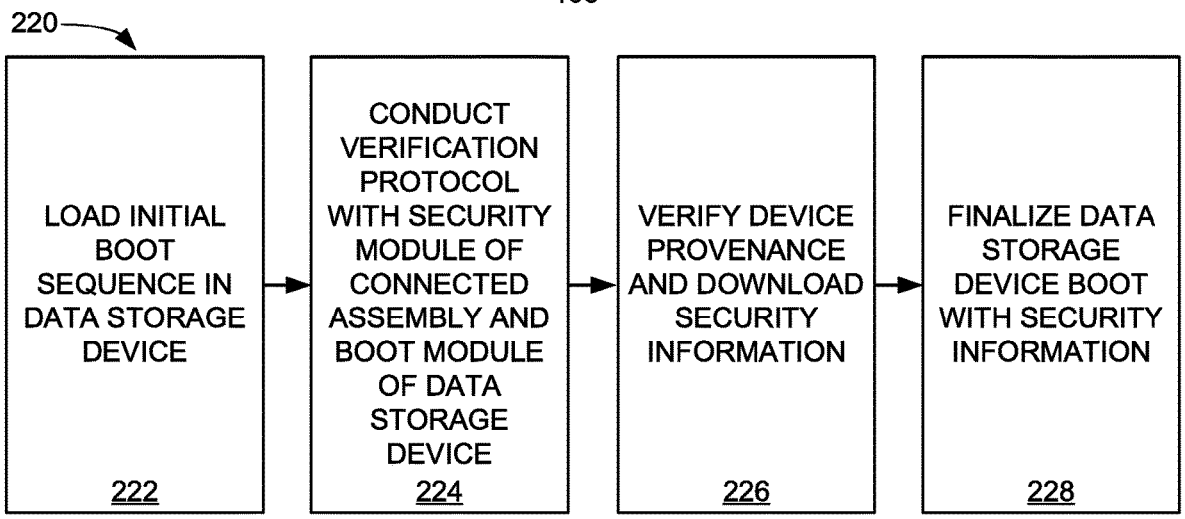
FIG. 7 conveys an example process flow for a device boot operation executed in accordance with some embodiments.

As a result of the operation of the secure boot assembly 214 in combination with the boot module 212, the data storage device 202 can be verified as trustworthy, security information can be verified authentic, and boot operations can be conducted securely without connection to any network host. FIG. 7 depicts a process flow of an example secure boot protocol 220 that can be conducted by the data storage device 202 of FIG. 6. Much like the booting of a connected data storage device in FIG. 5, step 222 begins by loading initial boot sequence commands and/or data that prompt the data storage device for initialization and full function. It is contemplated that step 222 is conducted without a connection to a network or executes a deactivation of any existing connections to a network.

If not already physically connected, a secure boot assembly is inserted into a front end bus of the data storage device. The connected secure boot assembly allows step 224 to conduct a verification protocol with the security module of the assembly in combination with the boot module of the data storage device. The verification protocol can involve one or more polling operations where assorted hardware is tested for authenticity. The verification protocol may execute one or more software tests to verify firmware, software, data maps, and/or cache authenticity. In some embodiments, the verification protocol of step 224 verifies the trustworthiness of the security information stored, or derived, in the security module.

Through the verification protocol, the provenance of the data storage device and the security information of the secure boot assembly is verified in step 226. Consequently, the security information is provided to the boot module of the data storage device and step 228 can finalize the data storage device startup and initialization procedures necessary to allow full function of the data storage device. The initialized data storage device can then be connected to a network as a trusted source/repository with a vetted provenance, which increases the efficiency of network initialization of the data storage device while maintaining secure status.

Figure 8:
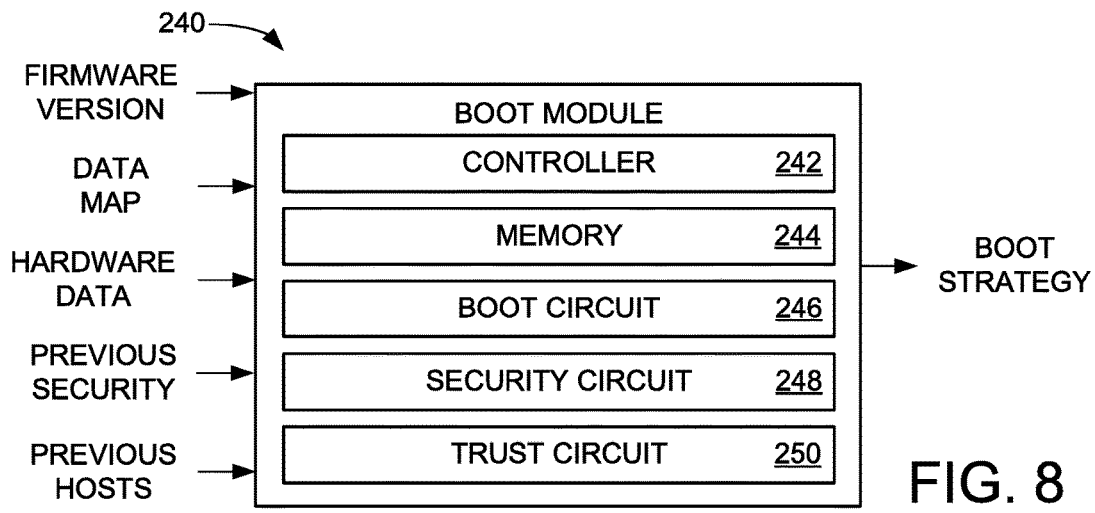
FIG. 8 represents an example boot module that can be utilized by a data storage device in assorted embodiments.

FIG. 8 depicts a block representation of an example boot module 240 that can be employed in a data storage device in accordance with assort embodiments. The boot module 240 may have a local controller 242 that operates independently, or in combination with, other controllers of a data storage device. It is contemplated that the boot module 240 may utilize other data storage device controllers without having a dedicated boot controller, as shown. The controller 242 can engage a local memory 244, which may be a volatile or non-volatile buffer that allows information, data, and tests to be stored before, during, and after the initialization of a data storage device.

The boot module 242 can consist of a boot circuit 246 that carries out the boot sequence necessary to initialize the various hardware and software aspects of a data storage device. The boot circuit 246 can be configured to pause boot sequence execution in lieu of security information and then commence the boot sequence once the device and security information has been verified as trustworthy. The boot circuit 246 can be complemented by the security circuit 248 that conducts internal security measures that test, poll, and verify the operation and trustworthiness of assorted aspects of the data storage device over time. The security circuit 248 may store, or generate, security keys, certificates, and codes that can be used by a connected security module to ensure the data storage device is authentic and free of infiltration from unwanted parties.

A trust circuit 250 can be configured to maintain a trusted relationship between the data storage device and a network, once connected. The trust circuit 250 can poll current security information and alter the level of security depending on encountered events. As a non-limiting example, the trust circuit 250 can identify a side-channel attack attempt on the data storage device, or a connected network node, and generate new, heightened security information from the connected security module of the secure boot assembly. The ability to maintain a trusted device provenance over time allows the boot module 240 to be useful even after the data storage device is initialized and functioning as part of a network.

Figure 9:
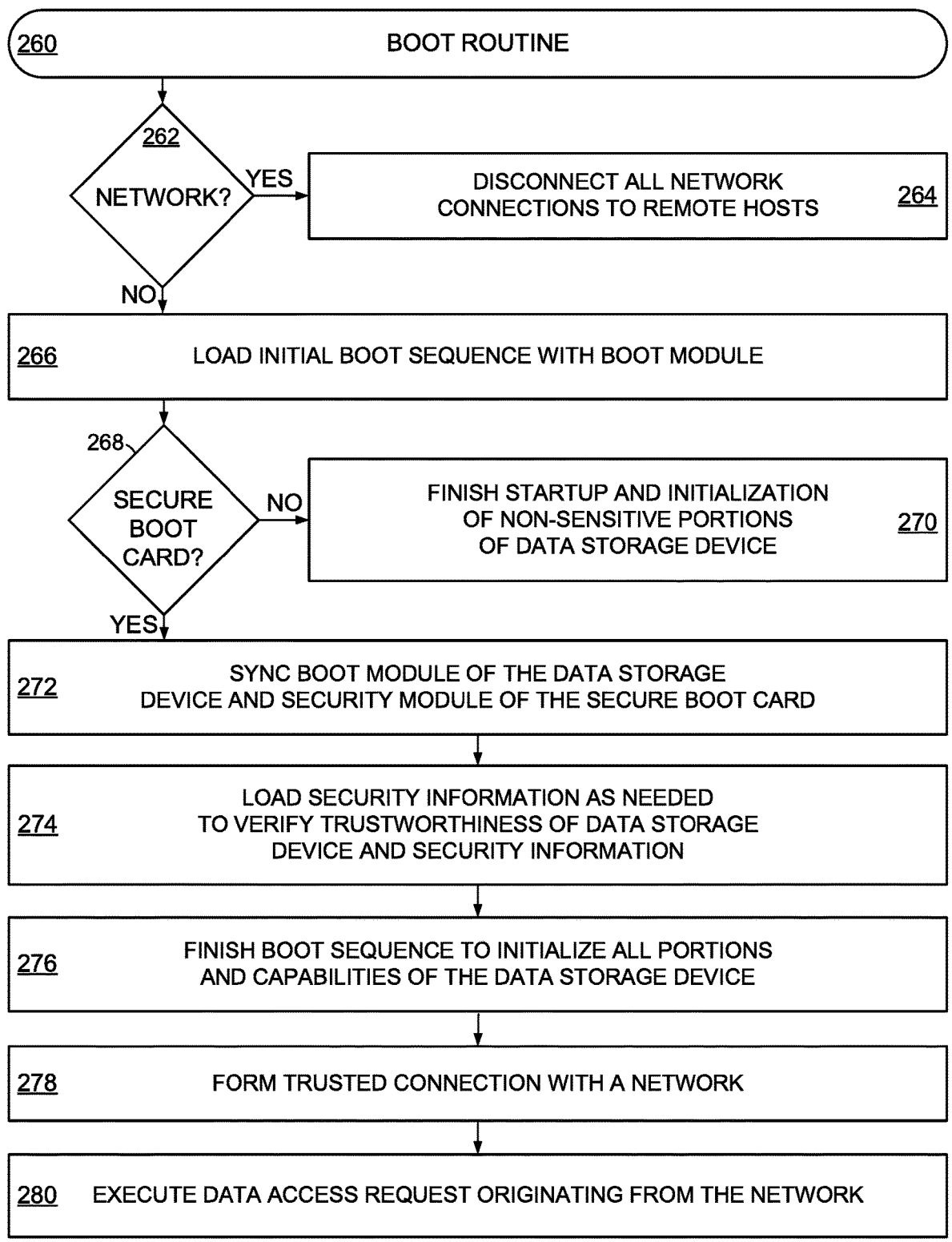
FIG. 9 is a flowchart of an example secondary memory routine that can be executed with the assorted embodiments of FIGS. 1-8.

FIG. 9 is a flowchart of an example secure boot routine 260 that can be carried out with one or more data storage devices in accordance with various embodiments. A data storage device is expected to have an externally accessible front end bus capable of connecting an external security module to an internal boot module. The routine 260 begins with decision 262 evaluating if a network connection exists between a data storage device and a remote host. If so, step 264 disconnects all wired, and/or wireless, signal connections.

Once no connection is present with a network or remote host that can allow infiltration by third-parties, step 266 loads an initial boot sequence with the boot module that preliminarily conducts actions preparing various software and hardware aspects of the data storage device to be initialized. A boot sequence is not a particular set of commands or actions and can vary device to device, but in some embodiments entails at least polling local memory for data and executing software to the point of needing security information to continue. The boot sequence may also generate various data, such as clock values, data tables, and random numbers.

While step 266 can continue, at some time after step 266 begins, decision 268 determines if a secure boot assembly (card) is physically connected to a front end bus of the data storage device. If not, step 270 carries out the startup and initialization of non-sensitive portions of a data storage device. That is, step 270 can complete the boot sequence for less than all of the aspects of the data storage device due to the lack of security clearance. It is contemplated that non-sensitive portions of the data storage device can consist of non-administrative information and data, such as data capacity, location of data, and out-of-date versions of actual data. Hence, step 270 can either initialize the data storage device to full functionality while restricting access to sensitive data, information, and software or initialize less than all the functionality of the data storage device to prevent access to sensitive data, information, and software.

In the event a secure boot assembly is inserted into the front end bus, step 272 syncs at least the boot module of the data storage device with the security module of the secure boot assembly to begin authentication of trustworthiness. It is noted that step 272 may conduct one or more security actions, such as polling, testing, and. verifying, before certifying that the data storage device has not been infiltrated or tampered by a third-party and that the security information of the secure boot assembly is genuine and untainted by third-parties.

Next, step 274 loads security information from the security module of the secure boot assembly to allow the boot sequence to initialize sensitive data, information, software, and firmware. The initialization of sensitive aspects completes in step 276 with the full capabilities, and data, of the data storage device available for use. With the data storage device disconnected from any non-physically connected host, the capabilities may not be utilized until the data storage device is physically connected to a trusted host, such as a motherboard, server, or switch. However, the boot module of the data storage device may restrict certain data, information, or software from accessing the full capabilities of the device until step 278 forms a trusted interconnection. That is, the security and/or trust circuitry of the boot module can restrict accessing the data storage device, despite the drive being fully initialized and authenticated as trustworthy, until at least one trust protocol is conducted to authenticate the connected host, device, or node as genuine, unaltered, and trustworthy.

The formation of one or more trusted interconnections in step 278 allows step 280 to execute any number of data access operations to service the requests of interconnected hosts. In the configuration where a network controller, server, or switch is a trusted host from the actions of step 278, the data storage device may service data access requests from an unknown number of upstream sources without knowing, or verifying their trustworthiness, but instead relying on the trusted status of the network to provide access to the full capabilities of the data storage device.

Through the assorted embodiments of a data storage device with an external front end bus, a secure boot assembly can provide supplemental processing, security, and memory capabilities that can efficiently and reliably initialize the data storage device without the device being connected to a network. The intelligent verification and authentication of the data storage device and security information provided by a connected secure boot assembly ensures the trustworthiness of the data storage device for future connections to hosts. The ability to conduct a variety of operations to certify the secure initialization of a data storage device without a network connection allows device boot, operations to be conducted without concern for third-party attacks during boot operations, which further ensures the trustworthiness of the device when connected to a network.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
a data storage device comprising:
 a boot module connected to a front end bus;
 a network connector that is separate from the front end bus;
 a non-volatile memory;
 a controller communicatively coupled to the network connector and to the non-volatile memory, the controller configured to service read and write commands received via the network connector using the non-volatile memory, thereby providing for storage of user data obtained via the network connector into the non-volatile memory, and also providing for retrieval of the stored user data from the non-volatile via the network connector; and
a secure boot assembly connected to the front end bus, the secure boot assembly comprising a non-volatile memory and having a security module connected to the boot module to authenticate a trustworthiness of the data storage device while any network connection to any remote host via the network connector is disconnected from the data storage device.

2. The apparatus of claim 1, wherein the secure boot assembly comprises a printed circuit board.

3. The apparatus of claim 1, wherein the front end bus is positioned external to a housing of the data storage device.

4. The apparatus of claim 2, wherein the security module comprises hardware resident on the printed circuit board.

5. The apparatus of claim 1, wherein a security circuit of the boot module conducts at least one test to verify the operation and trustworthiness of the data storage device.

6. The apparatus of claim 1, wherein a trust circuit of the boot module identifies an attempted third-party attack on the data storage device.

7. The apparatus of claim 6, wherein the boot module alters security information in response to the identified attack.

8. A method comprising:
connecting a data storage device to a secure boot assembly, the data storage device having a boot module connected to a front end bus and the secure boot assembly inserted into the front end bus, the secure boot assembly comprising a non-volatile memory and having a security module connected to the boot module;
verifying a trustworthiness of the data storage device with the boot module while any network connection to any remote host is disconnected from the data storage device;
authenticating security information provided to the boot module with the security module without the secure boot assembly connected to any network; and
loading the security information in the data storage device to initialize and make available secure data access capabilities of the data storage device; and
forming a trusted connection with a network via a network connector of the data storage device that is separate from the front end bus.

9. The method of claim 8, wherein the trustworthiness of the data storage device is verified by the boot module in conjunction with the security module of the secure boot assembly.

10. The method of claim 9, wherein the security module provides the boot module with security credentials to allow software and hardware initialization.

11. The method of claim 8, wherein the secure boot assembly is physically connected to the front end bus prior to initialization of the data storage device.

12. The method of claim 8, wherein one or more verification functions are executed by an authentication module of the secure boot assembly to ensure security information of the secure boot assembly is authentic and trustworthy.

13. The method of claim 12, wherein the one or more verification functions comprise a source and a destination for existing security information.

14. The method of claim 12, wherein the authentication module generates at least one algorithm to ensure no tampering of existing security information has occurred.

15. The method of claim 12, wherein the authentication module alters security information in response to the security information becoming stale.

16. A method comprising:
initializing a data storage device with an unoccupied front end bus;
executing an initial boot sequence with a boot module of the data storage device while any network connection to any remote host is disconnected from the data storage device, the initial boot sequence providing less than all of the data storage capabilities possible with the data storage device in response to the unoccupied front end bus;
connecting a secure boot assembly to the front end bus, the secure boot assembly comprising a non-volatile memory and having a security module connected to the boot module;
verifying a trustworthiness of the data storage device with the boot module without the data storage device connected to any network;
authenticating security information provided to the boot module with the security module without the secure boot assembly connected to any network;

loading the security information in the data storage device to initialize and make available secure data access capabilities of the data storage device; and forming a trusted connection with a network via a network connector of the data storage device that is separate from the front end bus.

17. The method of claim 16, wherein the secure boot assembly is removed from the front end bus after the security information is loaded.

18. The method of claim 17, wherein the data storage device retains secure data access capabilities after the secure boot assembly is removed.

19. The method of claim 16, wherein the boot module completes a boot sequence for non-sensitive portions of the data storage device prior to the secure boot assembly being connected to the front end bus.

20. The method of claim 19, wherein the non-sensitive portions of the data storage device comprises non-administrative information and data.

* * * * *